(12) United States Patent
Ooms et al.

(10) Patent No.: US 6,468,939 B1
(45) Date of Patent: Oct. 22, 2002

(54) DOUBLE METAL CYANIDE CATALYSTS FOR THE PREPARATION OF POLYETHER POLYOLS

(75) Inventors: Pieter Ooms, Krefeld (DE); Jörg Hofmann, Krefeld (DE); Pramod Gupta, Bedburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/525,882

(22) Filed: Mar. 15, 2000

(30) Foreign Application Priority Data

Mar. 24, 1999 (DE) .......................................... 199 13 260

(51) Int. Cl.$^7$ ................................................ B01J 27/26
(52) U.S. Cl. ..................... 502/162; 502/163; 502/164; 502/175; 502/200
(58) Field of Search ................................ 502/162, 163, 502/164, 175, 200

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. ............... 502/175 |
| 5,470,813 A | 11/1995 | Le-Khac ...................... 502/175 |
| 5,482,908 A | 1/1996 | Le-Khac ...................... 502/156 |
| 5,545,601 A | 8/1996 | Le-Khac ...................... 502/156 |
| 5,627,120 A | 5/1997 | Le-Khac ...................... 502/156 |
| 5,693,584 A | 12/1997 | Le-Khac ...................... 502/159 |
| 5,712,216 A | 1/1998 | Le-Khac et al. ............. 502/175 |
| 5,714,428 A | 2/1998 | Le-Khac ...................... 502/159 |
| 6,063,897 A * | 5/2000 | Le-Khac et al. ............. 502/154 |
| 6,323,375 B1 * | 11/2001 | Hofmann et al. ............ 502/152 |

FOREIGN PATENT DOCUMENTS

| | | |
|---|---|---|
| EP | 090445 | 10/1983 |
| EP | 759450 | 2/1997 |
| JP | 4-145123 | 5/1992 |

* cited by examiner

Primary Examiner—Elizabeth D. Wood
(74) Attorney, Agent, or Firm—Joseph C. Gil; N. Denise Brown; Carolyn M. Sloane

(57) ABSTRACT

This invention relates to new double metal cyanide (DMC) catalysts, a process for the preparation of these DMC catalysts, and to a process for the production of polyether polyols by the polyaddition of alkylene oxides to starter compounds which comprise active hydrogen atoms, wherein the catalyst comprises a) one or more double metal cyanide compounds, b) one or more organic complexing ligands, and c) one or more organic phosphates, organic phosphites, organic phosphonates, organic phosphonites, organic phosphinates or organic phosphinites. The catalysts according to the invention exhibit a considerably increased activity for polyether polyol production.

10 Claims, No Drawings

DOUBLE METAL CYANIDE CATALYSTS FOR THE PREPARATION OF POLYETHER POLYOLS

BACKGROUND OF THE INVENTION

This invention relates to novel double metal cyanide (DMC) catalysts, to a process for the preparation of these novel DMC catalysts, and to a process for the preparation of polyether polyols by the polyaddition of alkylene oxides to starter compounds which comprise active hydrogen atoms in the presence of these novel DMC catalysts and to the polyether polyols produced by this process.

Double metal cyanide (DMC) catalysts for the polyaddition of alkylene oxides to starter compounds which comprise active hydrogen atoms are known and described in, for example, U.S. Pat. Nos. 3,404,109, 3,829,505, 3,941,849 and 5,158,922. Compared with the conventional preparation of polyether polyols by means of alkali catalysts such as, for example, alkali hydroxides, the use of these DMC catalysts for the preparation of polyether polyols has the particular effect of reducing the proportion of monofunctional polyethers with terminal double bonds, i.e., the so-called monools. Thus, the polyether polyols which are obtained from DMC catalysts can be processed to form high-grade polyurethanes (e.g., elastomers, foams, coatings). DMC catalysts are usually obtained by the reaction of an aqueous solution of a metal salt with an aqueous solution of a metal cyanide salt in the presence of an organic complexing ligand such as, for example, an ether. In a typical catalyst preparation, for example, aqueous solutions of zinc chloride (in excess) and potassium hexacyanocobaltate are mixed, and dimethoxyethane (glyme) is subsequently added to the formed suspension. After filtration and washing of the catalyst with aqueous glyme solution, an active catalyst of general formula:

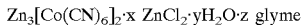

is obtained. This process is described in detail in, for example, EP-A 700 949.

Other DMC catalysts are disclosed in, for example, JP-A 4,145,123, U.S. Pat. No. 5,470,813, EP-A 700 949, EP-A 743 093, EP-A 761 708, and WO 97/40086. These DMC catalysts are described as further reducing the proportion of monofunctional polyethers comprising terminal double bonds during the preparation of polyether polyols by the use of tert.-butanol as the organic complexing ligand, either alone or in combination with a polyether as described in, for example, EP-A 700 949, EP-A 761 708, and WO 97/40086. Moreover, by the use of these DMC catalysts in the preparation of polyether polyols the induction time of the polyaddition reaction of alkylene oxide with corresponding starter compounds is reduced and the catalytic activity is increased.

The object of the present invention was to provide improved DMC catalysts for the polyaddition of alkylene oxides to corresponding starter compounds, which catalysts exhibit further increased catalytic activity in comparison with the various types of catalysts known previously. By reducing the requisite times of alkoxylation, this results in improved economics of the production process for polyether polyols. Ideally, due to its increased activity, the catalyst can then be used in such low concentrations (25 ppm or less) such that the very costly separation of catalyst from the product is no longer necessary and the product can be used directly for the production of polyurethane.

Surprisingly, it has now been found that DMC catalysts which contain esters of phosphoric acid, phosphorous acid, phosphonic acid, phosphonous acid, phosphinic acid or phosphinous acid as complexing ligands exhibit a considerably increased activity with regard to the production process of polyether polyols.

SUMMARY OF THE INVENTION

The present invention therefore relates to a double metal cyanide (DMC) catalyst comprising:
 a) one or more, preferably one, double metal cyanide compounds,
 b) one or more, preferably one, organic complexing ligands (which are different from c)), and
 c) one or more, preferably one, compound selected from the group consisting of organic phosphates, organic phosphites, organic phosphonates, organic phosphonites, organic phosphinates and organic phosphinites.

The catalyst according to the invention may also optionally contain d) water, preferably in an amount of 1 to 10% by weight, based on the total weight of the catalyst, and/or e) one or more water-soluble metal salts, preferably in an amount of 5 to 25% by weight, based on the total weight of the catalyst from the preparation of the double metal cyanide compounds.

Suitable water-soluble metal salts include those corresponding to the general formula (I): $M(X)_n$, for the preparation of double metal cyanide compounds a). In formula (I), M represents a metal which is selected from the group consisting of: Zn (II), Fe (II), Ni (II), Mn (II), Co (II), Sn (II), Pb (II), Fe (III), Mo (IV), Mo (VI), Al (III), V (V), V (IV), Sr (II), W (IV), W (VI), Cu (II) and Cr (III). Zn (II), Fe (II), Co (II) and Ni (II) are particularly preferred metals. The anions X may be the same or different, are preferably the same, and are each independently (and preferably) selected from the group consisting of halides, hydroxides, sulfates, carbonates, cyanates, thiocyanates, isocyanates, isothiocyanates, carboxylates, oxalates or nitrates. The value of n is 1, 2 or 3.

The double metal cyanide compounds a) which are contained in the catalysts according to the invention comprise the reaction products of (i) one or more water-soluble metal salts and (ii) one or more water-soluble metal cyanide salts.

Water-soluble metal salts which are suitable for the production of double metal cyanide compounds a) include, preferably, metal salts corresponding to general formula (I): $M(X)_n$, wherein: M represents a metal and is selected from the group consisting of: Zn (II), Fe (II), Ni (II), Mn (II), Co (II), Sn (II), Pb (II), Fe (III), Mo (IV), Mo (VI), Al (III), V (V), V (IV), Sr (II), W (IV), W (VI), Cu (II) and Cr (III). The metals Zn (II), Fe (II), Co (II) and Ni (II) are particularly preferred. The anions X may be either the same or different, but are preferably the same, and are each independently (and preferably) selected from the group consisting of halides, hydroxides, sulfates, carbonates, cyanates, thiocyanates, isocyanates, isothiocyanates, carboxylates, oxalates or nitrates. The value of n is 1, 2 or 3.

Examples of suitable water-soluble metal salts include zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt (II) thiocyanate, nickel(II) chloride and nickel(II) nitrate. Mixtures of different water-soluble metal salts can also be used.

Water-soluble metal cyanide salts which are suitable for the production of double metal cyanide compounds a)

include, for example, those which preferably correspond to general formula (II):

$$(Y)_a M'(CN)_b (A)_c \quad \text{(II)}$$

wherein:
M' represents a metal and is selected from the group consisting of Fe(II),Fe(III), Co(II), Co(III), Cr(II), Cr(III), Mn(II), Mn(III), Ir(III), Ni(II), Rh(III), Ru(II), V(IV) and V(V); and preferably represents a metal selected from the group consisting of Co(II), Co(III), Fe(II), Fe(III), Cr(III), Ir(III) and Ni(II);

each Y represents a cation and may be the same or different (preferably the same), and each is independently selected from the group consisting of alkali metal ions and alkaline earth metal ions;

each A represents an anion and may be the same or different (preferably the same), and each is selected from the group consisting of halides, hydroxides, sulfates, carbonates, cyanates, thiocyanates, isocyanates, isothiocyanates, carboxylates, oxalates and nitrates;

a, b and c each represents an integer value, with the values of a, b and c being selected such that the electroneutrality of the metal cyanide salt is achieved; a preferably represents 1, 2, 3 or 4; b preferably represents 4, 5 or 6; and c preferably has the value 0.

The water-soluble metal cyanide salt may contain one or more of these metals M' as described above. Since the cations Y are independently selected, the water-soluble metal cyanide salt may contain different alkali metal ions and/or alkaline earth metal ions. Preferably, however, the cations Y are the same alkali metal ions or alkaline earth metal ions. The anions A are also independently selected such that the water-soluble metal cyanide salt may contain different anions selected from the group consisting of halides, hydroxides, sulfates, carbonates, cyanates, thiocyanates, isocyanates, isothiocyanates, carboxylates, oxalates and nitrates. a, b and c each represents an integer, with the values of a, b and c being selected such that a metal cyanide salt which is electroneutral is formed.

Some examples of suitable water-soluble metal cyanide salts include compounds such as potassium hexacyanocobaltate(III), potassium hexacyanoferrate(II), potassium hexacyanoferrate(III), calcium hexacyanocobaltate(III) and lithium hexacyanocobaltate (III).

The preferred double metal. cyanide compounds a) which are present in the DMC catalysts according to the invention include compounds corresponding to the general formula (III):

$$M_x[M'_{x'}CN_y]_z \quad \text{(III)}$$

wherein:
M represents a metal and is selected from the group consisting of: Zn (II), Fe (II), Ni (II), Mn (II), Co (II), Sn (II), Pb (II), Fe (III), Mo (IV), Mo (VI), Al (III), V (V), V (IV), Sr (II), W (IV), W (VI), Cu (II) and Cr (III); with the metals Zn (II), Fe (II), Co (II) and Ni (II) being particularly preferred;

M' represents a metal and is selected from the group consisting of Fe(II), Fe(III), Co(II), Co(III), Cr(II), Cr(III), Mn(II), Mn(III), Ir(III), Ni(II), Rh(III), Ru(II), V(IV) and V(V); and preferably represents a metal selected from the group consisting of Co(II), Co(III), Fe(II), Fe(III), Cr(III), Ir(III) and Ni(II); and x, x', y and z: each represents an integer, and are selected such that the electroneutrality of the double metal cyanide compound is achieved. It is preferred that x represents 3, x' represents 1, y represents 6 and z represents 2.

In a preferred embodiment of the present invention, the double metal cyanide compounds a) include those compounds which correspond to the general formula (III) above wherein:

x=3, x'=1, y=6 and z=2,

M represents a metal and is selected from the group consisting of Zn(II), Fe(II), Co(II) or Ni(II), and M' represents a metal and is selected from the group consisting of Co(III), Fe(III), Cr(III) or Ir(III).

Examples of suitable double metal cyanide compounds a) include, but are not limited to, zinc hexacyanocobaltate(II), zinc hexacyanoiridate(III), zinc hexacyanoferrate(III) and cobalt(II) hexacyanocobaltate(III). Other examples of suitable double metal cyanide compounds include those disclosed in, for example, U.S. Pat. No. 5,158,922, the disclosure of which is herein incorporated by reference. Zinc hexacyanocobaltate(III) is most preferably used as the double metal cyanide compound a) in the present invention.

The organic complexing ligands b) which are contained in the DMC catalysts according to the invention are also known in principle, and are described in detail in the prior art. These include those organic complexing ligands such as the compounds described in, for example, U.S. Pat. Nos. 5,158,922, 3,404,109, 3,829,505, 3,941,849 and 5,470,813, the disclosures of which are herein incorporated by reference, and in EP-A 700 949, EP-A 761 708, JP-A 4 145 123, EP-A 743 093 and WO 97/40086. The preferred organic complexing ligands include water-soluble organic compounds comprising hetero atoms such as, for example, oxygen, nitrogen, phosphorus and/or sulfur, which are capable of forming complexes with double metal cyanide compounds a). Examples of suitable organic complexing ligands include, but are not limited to, alcohols, aldehydes, ketones, ethers, esters, amides, ureas, nitriles, sulfides and mixtures thereof. The preferred organic complexing ligands include water-soluble aliphatic alcohols such as, for example, ethanol, isopropanol, n-butanol, iso-butanol, sec.-butanol and tert.-butanol. Tert.-butanol is a particularly preferred organic complexing ligand.

Although it is possible, at least theoretically, for the organic phosphates, organic phosphites, organic phosphonates, organic phosphonites, organic phosphinates or organic phosphinites, i.e., component c) described above, to be used as suitable organic complexing ligands, i.e., component b), these organic compounds are excluded from the organic complexing ligands, i.e., component b), in the present invention.

The organic complexing ligand is either added during the preparation of the catalyst, i.e., during the reaction of (i) one or more metal salts with (ii) one or more metal cyanide salts, and/or is added immediately after the precipitation of double metal cyanide compound a), to the formed suspension. The organic complexing ligand is normally used in excess. It is also possible to add additional organic complexing ligand to the double metal cyanide compound a) after it has been isolated from the suspension.

The DMC catalysts according to the invention comprise double metal cyanide compounds a) in amounts of 20 to 90% by weight, preferably 25 to 80% by weight, based on the total weight of the resultant DMC catalyst; and contain organic complexing ligands b) in amounts of 0.5 to 30% by weight, preferably 1 to 25% by weight, based on the total weight of the resultant DMC catalyst. In addition, the DMC catalysts according to the invention usually contain 1 to 80% by weight, preferably 1 to 40% by weight, based on the total weight of the resultant DMC catalyst, of one or more organic phosphates, organic phosphites, organic phosphonates, organic phosphonites, organic phosphinates or organic phosphinites, i.e., component c).

Examples of organic phosphates which are suitable for the preparation of the catalysts according to the invention include, for example, mono-, di- or triesters of phosphoric acid, mono-, di-, tri- or tetraesters of pyrophosphoric acid, and mono-, di-, tri-, tetra- or polyesters of polyphosphoric acid and alcohols comprising 1 to 30 carbon atoms.

Organic phosphites which are suitable for the preparation of the catalysts according to the invention include, for example, the mono-, di- or triesters of phosphorous acid and alcohols comprising 1 to 30 carbon atoms.

Examples of organic phosphonates which are suitable for the preparation of the catalysts according to the invention include, but are not limited to, mono- or diesters of phosphonic acid, alkylphosphonic acids, arylphosphonic acids, alkoxycarbonyl-alkylphosphonic acids, alkoxycarbonylphosphonic acids, cyanoalkylphosphonic acids and cyanophosphonic acids, and mono-, di-, tri- or tetraesters of alkyl-diphosphonic acids and alcohols comprising 1 to 30 carbon atoms.

Phosphonites which are suitable for the preparation of the catalysts according to the invention include, for example, diesters of phosphonous acid or of arylphosphonous acid and alcohols comprising 1 to 30 carbon atoms.

Phosphinates which are suitable for the preparation of the catalysts according to the invention include, for example, esters of phosphinic acid, alkylphosphinic acids, dialkylphosphinic acids or arylphosphinic acids and alcohols comprising 1 to 30 carbon atoms.

Phosphinites which are suitable for the preparation of the catalysts according to the invention include, for example, esters of alkylphosphinous acids, dialkylphosphinous acids or arylphosphinous acid and alcohols comprising 1 to 30 carbon atoms.

Suitable alcohol components for the formation of the various organic phosphates, organic phosphites, organic phosphonates, organic phosphonites, organic phosphinates and organic phosphinites include, for example, the mono- or aryl-, aralkyl-, alkoxyalkyl- and/or alkyl alcohols containing from 1 to 30 carbon atoms, preferably 1 to 24 carbon atoms, and most preferably 1 to 20 carbon atoms. It is preferred that these are aralkyl-, alkoxyalkyl- and/or alkyl alcohols, and most preferably alkoxyalkyl- and alkyl alcohols.

The organic phosphates, organic phosphites, organic phosphonates, organic phosphonites, organic phosphinates or organic phosphinites, i.e., component c), which are used for the production of the catalysts according to the invention are generally obtained by the reaction of phosphoric acid, pyrophosphoric acid, polyphosphoric acids, phosphonic acid, alkylphosphonic acids, arylphosphonic acids, alkoxycarbonylalkyl-phosphonic acids, alkoxycarbonylphosphonic acids, cyano-alkylphosphonic acids, cyanophosphonic acid, alkyldiphosphonic acids, phosphonous acid, phosphorous acid, phosphinic acid, phosphinous acid or halogen derivatives thereof, or of phosphorus oxides, with hydroxy compounds containing 1 to 30 carbon atoms such as, for example, methanol, ethanol, propanol, butanol, pentanol, hexanol, heptanol, octanol, nonanol, decanol, dodecanol, tridecanol, tetradecanol, pentadecanol, hexadecanol, heptadecanol, octadecanol, nonadecanol, methoxymethanol, ethoxymethanol, propoxymethanol, butoxymethanol, 2-ethoxy-ethanol, 2-propoxyethanol, 2-butoxy-ethanol, phenol, ethyl hydroxyacetate, propyl hydroxyacetate, ethyl hydroxypropionates, propyl hydroxypropionate, 1,2-ethanediol, 1,2-propanediol, 1,2,3-trihydroxy-propane, 1,1,1-trimethylolpropane or pentaerythritol.

The substances which are preferred in this respect include, for example, esters such as phosphoric acid triethyl ester, phosphoric acid tributyl ester, phosphoric acid trioctyl ester, phosphoric acid tris(2-ethylhexyl) ester, phosphoric acid tris-(2-butoxyethyl) ester, butylphos-phonic acid dibutyl ester, phenylphosphonic acid dioctyl ester, phosphonoformic acid triethyl ester, phosphonoacetic acid trimethyl ester, phosphonoacetic acid triethyl ester, 2-phosphonopropionic acid trimethyl ester, 2-phosphonopropionic acid triethyl ester, 2-phosphonopropionic acid tripropyl ester, 2-phosphonopropionic acid tributyl ester, 3-phosphonopropionic acid triethyl ester, tributyl phosphite, trilauryl phosphite, tris-(3-ethyloxethanyl-3-methyl) phosphite and heptakis(dipropylene glycol) phosphite.

Methods of producing esters of phosphoric acid, phosphorous acid, phosphonic acid, phosphonous acid, phosphinic acid and phosphinous acid are known, and are described in detail in, for example, Kirk-Othmer: "Encyclopedia of Chemical Technology", Volume 18, 4th Edition, 1996, page 737, et seq., the disclosure of which is herein incorporated by reference; in "Römpp's Lexikon Chemie", Volume 4, 10th Edition, Stuttgart/New York, 1998, page 3280, et seq.; in "Ullmann's Encyclopedia of Industrial Chemistry", Volume A19, 5th Edition, 1991, page 545, et seq.; and in "Houben-Weyl: Methoden der organischen Chemie", Volumes XII/1 and XII/2, Stuttgart 1963/1964.

Mixtures of any of the aforementioned compounds can also be used as component c) in the present invention.

Analysis of the catalyst composition is usually effected by means of elemental analysis, thermogravimetric analysis, or by the extractive removal of the organic phosphate, organic phosphite, organic phosphonate, organic phosphonite, organic phosphinate or organic phosphinite followed by gravimetric determination.

The catalysts according to the invention can be crystalline, partially crystalline or amorphous. Analysis of the crystallinity is usually effected by X-ray powder diffraction measurements.

The preferred catalysts according to the invention are those which contain:

a) zinc hexacyanocobaltate (III), b) tert.-butanol and c) an organic phosphate, organic phosphite, organic phosphonate, organic phosphonite, organic phosphinate or organic phosphinite.

The process for the production of the DMC catalysts according to the invention comprises (1) reacting, in an aqueous solution, α) (i) one or more metal salts, particularly those corresponding to formula (I) above, with (ii) one or more metal cyanide salts, particularly those corresponding to formula (II) above, to form a suspension; (2) isolating the catalyst from the suspension, and (3) drying the catalyst. In this process, β) the one or more organic complexing ligands (which are not organic phosphates, phosphites, phosphonates, phosphonites, phosphinates or phosphinites) are added as part of the aqueous solution during the reaction (1) above, and/or to the suspension formed by the reaction (1) above, and optionally, to the catalyst after the isolation, (2) above, of the catalyst from the suspension. In addition, the process requires that the suspension formed by the reaction (1) above, be treated with γ) one or more compounds selected from the group consisting of organic phosphates, organic phosphites, organic phosphonates, organic phosphonites, organic phosphinates or organic phosphinites, i.e., component c) of the catalyst composition.

In a preferred embodiment, aqueous solutions of the metal salt such as, for example, zinc chloride, are used in stoichiometric excess (i.e., at least 50 mol % with respect to the metal cyanide salt) and of the metal cyanide salt such as, for example, potassium hexacyanocobaltate, are preferably reacted first in the presence of the organic complexing ligand such as, for example, tert.-butanol (i.e., component b in the DMC catalyst), which results in the formation of a suspension. This suspension contains the double metal cyanide compound such as, for example zinc hexacyanocobaltate (i.e., component a)), water d), excess metal salt c), and the organic complexing ligand b).

The organic complexing ligand, component b), can be present in the aqueous solution of the metal salt and/or of the metal cyanide salt, or can be added directly to the suspension obtained after precipitation of the double metal cyanide compound, component a). It has proved to be advantageous to mix the aqueous solutions and the organic complexing ligands, component b), with intensive stirring. The suspension which is formed is usually subsequently treated with the organic phosphate, organic phosphite, organic phosphonate, organic phosphonite, organic phosphinate or organic phosphinite, i.e., component c). The organic phosphate, organic phosphite, organic phosphonate, organic phosphonite, organic phosphinate or organic phosphinite, component c), is preferably used here either in admixture with water and/or with the organic complexing ligand, component b).

This is followed by the isolation of the catalyst from the suspension by known techniques such as, for example, centrifugation, filtration, etc. In one preferred embodiment, the isolated catalyst is subsequently washed with an aqueous solution of the organic complexing ligand, component b), (e.g., by re-suspending it in the aqueous solution, and subsequently, re-isolating it by filtration or centrifugation). In this manner, water-soluble by-products such as, for example, potassium chloride, can be removed from the DMC catalyst according to the invention.

The amount of organic complexing ligand, component b), present in the aqueous wash solution is preferably between 40 and 80% by weight, based on the total weight of the entire solution. Moreover, it is advantageous to add a small amount of the organic phosphate, organic phosphite, organic phosphonate, organic phosphonite, organic phosphinate or organic phosphinite, i.e., component c), which is used as component γ) in the process above, to the aqueous wash solution. Preferably, this component is present in an amount of 0.5 to 5% by weight, based on the total weight of the entire solution.

In addition, it is also advantageous to wash the catalyst more than once. The first washing operation can be repeated for this purpose, for example. It is preferable, however, to employ non-aqueous solutions for further washing operations. These non-aqueous solutions comprise, for example, a mixture of organic complexing ligands and the organic phosphate, phosphite, phosphonate, phosphonite, phosphinate or phosphinite, i.e., component c) of the DMC catalyst, which is used as component γ) in the process.

Subsequently, and optionally after pulverization, the washed catalyst is dried. Drying of the catalyst generally occurs at temperatures from 20 to 100° C. and at pressures from 0.1 mbar to normal pressure (1013 mbar).

The present invention further relates to the use of the DMC catalysts according to the invention in a process for the production of polyether polyols via the polyaddition of alkylene oxides to starter compounds which comprise active hydrogen atoms.

Ethylene oxide, propylene oxide, butylene oxide and mixtures thereof are preferably used as alkylene oxides. The synthesis of the polymer chains by alkoxylation can be effected by using one monomeric epoxide only, or it can also be effected randomly, or in the form of blocks by using 2 or 3 different monomeric epoxides. Details are given in "Ullmanns Encyclopädie der industriellen Chemie", Volume A21, 1992, page 670, et seq.

Compounds which have (number average) molecular weights from 18 to 2000 and which comprise 1 to 8 hydroxyl groups are preferably used as the starter compounds which comprise active hydrogen atoms. Some examples of such compounds include, but are not limited to, ethylene glycol, diethylene glycol, triethylene glycol, 1,2-propylene glycol, 1,4-butanediol, hexamethylene glycol, bisphenol A, trimethylol-propane, glycerol, pentaerythritol, sorbitol, cane sugar, degraded starch or water.

The compounds which are advantageously used as starter compounds comprising active hydrogen atoms are those which are produced, by conventional alkaline catalysis for example, from the aforementioned low molecular weight starter compounds and which constitute oligomeric alkoxylation products with (number average) molecular weights from 200 to 2000.

The polyaddition of alkylene oxides to starter compounds comprising active hydrogen atoms is catalyzed by the DMC catalysts of the present invention, generally conducted at temperatures from 20 to 200° C., preferably within the range from 40 to 180° C., most preferably at temperatures from 50 to 150° C. The reaction can be conducted at total pressures from 0.0001 to 20 bar. The polyaddition reaction can be conducted in bulk, or in an inert, organic solvent such as, for example, toluene and/or THF. The amount of solvent is usually from 10 to 30% by weight, based on the theoretical quantity of polyether polyol to be produced by this process.

The catalyst concentration is selected so that it is possible to achieve good control of the polyaddition reaction under the given reaction conditions. The catalyst concentration, in general, falls within the range from 0.0005% by weight to 1% by weight, preferably within the range from 0.001% by weight to 0.1% by weight, most preferably within the range from 0.001% to 0.0025% by weight, based on the theoretical quantity of polyether polyol to be produced by the process.

The (number average) molecular weights of the polyether polyols produced by the process according to the present invention fall within the range from 500 to 100,000 g/mol, preferably within the range from 1000 to 50,000 g/mol, and most preferably within the range from 2000 to 20,000 g/mol.

Polyaddition can be conducted continuously or discontinuously, for example, by a batch or semi-batch process.

Due to the considerably increased activity the DMC catalysts of the present invention can be used in very low concentrations (i.e., 25 ppm or less, based on the theoretical quantity of polyether polyol to be produced). If polyether polyols produced in the presence of the catalysts of the invention are used for the production of polyurethanes (Kunststoffhandbuch, Volume 7, Polyurethanes, 3rd Edition, 1993, pages 25–32 and 57–67), the step of removing the catalyst from the polyether polyol can be omitted without having a disadvantageous effect on the product quality of the resultant polyurethane.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Catalyst Preparation

Example A

Preparation of a DMC Catalyst Using Phosphoric Acid Tris-(2-butoxyethyl) Ester (Catalyst A)

A solution of 12.5 g (91.5 mmol) zinc chloride in 20 ml distilled water was added with vigorous stirring (24,000 rpm) to a solution of 4 g (12 mmol) potassium hexacyanocobaltate in 70 ml distilled water. This was followed immediately by the addition of a mixture of 50 g tert.-butanol and 50 g distilled water to the suspension formed above, and subsequently, the batch was vigorously stirred (24,000 rpm) for 10 minutes. Then, a mixture of 1 g phosphoric acid tris-(2-butoxyethyl) ester, 1 g tert.-butanol and 100 g distilled water was added, and the batch was stirred for 3 minutes (1000 rpm). The solid was isolated by filtration, and was then stirred for 10 minutes (10,000 rpm) with a mixture of 70 g tert.-butanol, 30 g distilled water and 1 g of the above phosphoric acid tris-(2-butoxyethyl) ester and filtered again. Finally, it was stirred again for 10 minutes (10,000 rpm) with a mixture of 100 g tert.-butanol and 0.5 g of the above phosphoric acid tris-(2-butoxyethyl) ester. After filtration, the catalyst was dried to constant weight at 50° C. under normal pressure.

Yield of dried, powdered catalyst: 4.3 g

Elemental analysis, thermogravimetric analysis and extraction: cobalt=11.9% by weight, zinc=25.3% by weight, tert.-butanol=10.6% by weight, phosphoric acid tris-(2-butoxyethyl) ester =7.0% by weight.

Example B

Preparation of a DMC Catalyst Using 2-phosphonopropionic Acid triethyl Ester (Catalyst B).

This catalyst was prepared using the same procedure as described above in Example A, except that 2-phosphonopropionic acid triethyl ester was used instead of phosphoric acid tris-(2-butoxyethyl) ester.

Yield of dried, powdered catalyst: 5.9 g

Elemental analysis, thermogravimetric analysis and extraction: cobalt=10.2% by weight, zinc=23.5% by weight, tert.-butanol=2.3% by weight, 2-phosphonopropionic acid triethyl ester=26.1% by weight.

Example C

Preparation of a DMC Catalyst Using Phosphoric Acid Tributyl Ester (Catalyst C).

This catalyst was prepared using the same procedure as described above in Example A, except that phosphoric acid tributyl ester was used instead of phosphoric acid tris-(2-butoxyethyl) ester.

Yield of dried, powdered catalyst: 5.5 g

Elemental analysis, thermogravimetric analysis and extraction: cobalt=11.1% by weight, zinc=24.9% by weight, tert-butanol=3.4% by weight, phosphoric acid tributyl ester= 16.3% by weight.

Example D

Preparation of a DMC Catalyst Using Phosphonoacetic Acid Triethyl Ester (Catalyst D)

This catalyst was prepared using the same procedure as described above in Example A, except that phosphonoacetic acid triethyl ester was used instead of phosphoric acid tris-(2-butoxyethyl) ester.

Yield of dried, powdered catalyst: 5.9 g

Elemental analysis, thermogravimetric analysis and extraction: cobalt=10.7% by weight. zinc=25.5% by weight, tert. butanol=1.2% by weight, phosphonoacetic acid triethyl ester=27.5% by weight.

Example E

Preparation of a DMC Catalyst Using Tris-(3-ethyloxethanyl-3-methyl) Phosphite (Catalyst E)

This catalyst was prepared using the same procedure as described above in Example A, except that tris-(3-ethyloxethanyl-3-methyl) phosphite was used instead of phosphoric acid tris-(2-butoxyethyl) ester.

Yield of dried, powdered catalyst: 5.4 g

Elemental analysis. thermogravimetric analysis and extraction: cobalt=11.0% by weight. zinc=24.7% by weight, tert.-butanol=5.6% by weight, tris(3-ethyloxethanyl-3-methyl) phosphite=17.3% by weight.

Example F (Comparison)

Preparation of a DMC Catalyst Using Tert.-butanol without an Organic Phosphate, Phosphite, Phosphonate, Phosphonite, Phosphinate or Phosphinite (Catalyst F)

This catalyst was synthesized according to the procedure described in JP-A 4 145 123.

A solution of 10 g (73.3 mmol) zinc chloride in 15 ml distilled water was added with vigorous stirring (24,000 rpm) to a solution of 4 g (12 mmol) potassium hexacyanocobaltate in 75 ml distilled water. This was followed immediately by the addition of a mixture of 50 g tert.-butanol and 50 g distilled water to the suspension which was formed, and subsequently, the batch was vigorously stirred (24,000 rpm) for 10 minutes. The solid was isolated by filtration, and was then stirred for 10 minutes (10,000 rpm) with 125 g of a mixture of tert.-butanol and distilled water (in a ratio by weight of 70/30) and was filtered again. Finally, it was stirred again for 10 minutes (10,000 rpm) with 125 g tert.-butanol. After filtration, the catalyst was dried to constant weight at 50° C. under normal pressure.

Yield of dried, powdered catalyst: 3.08 g

Elemental analysis: cobalt=13.6% by weight, zinc 27.4% by weight, tert.-butanol =14.2% by weight.

Preparation of Polyether Polyols

General Experimental Conditions 50 g of a polypropylene glycol starter (characterized by a number average molecular weight of 1000 g/mol) and 4–5 mg of a catalyst (20–25 ppm with respect to the amount of polyether polyol to be produced) were placed in a 500 ml pressurized reactor under a protective gas (argon) and heated to 105° C. with stirring. Propylene oxide (about 5 g) was then added as one portion until the total pressure had risen to 2.5 bar. No further propylene oxide was added until an accelerated pressure drop was observed in the reactor. This accelerated pressure drop indicated that the catalyst was activated. Then, the remaining amount of propylene oxide (145 g) was continuously added at a constant total pressure of 2.5 bar. After the addition of propylene oxide was completed, and a post-reaction time of 2 hours at 105° C., the volatile constituents were distilled off at 90° C. (1 mbar) and the batch was subsequently cooled to room temperature.

The polyether polyols obtained were characterized by determination of their OH numbers, content of double bonds and viscosities.

The progress of the reaction was followed by means of time-conversion curves (propylene oxide consumption [g] vs. time of reaction [min]). The induction time was determined from the intersection of the tangent to the steepest point of the time-conversion curve with the extrapolated base line of the curve. The propoxylation times which were definitive for the catalyst activity corresponded to the period between the activation of the catalyst (the end of the induction period) and the completion of the addition of propylene oxide. The total time of reaction was the sum of the induction and propoxylation times.

Example 1
Preparation of a Polyether Polyol Using Catalyst A (25 ppm)

| | |
|---|---|
| Induction time: | 233 min |
| Propoxylation time: | 316 min |
| Total reaction time: | 549 min |
| Polyether polyol: | |
| OH number (mg KOH/g): | 30.4 |
| double bond content (mmol/kg): | 8 |
| viscosity at 25° C. (mPa · s): | 914 |

Example 2
Preparation of a Polyether Polyol using Catalyst B (20 ppm)

| | |
|---|---|
| Induction time: | 148 min |
| Propoxylation time: | 149 min |
| Total reaction time: | 297 min |
| Polyether polyol: | |
| OH number (mg KOH/g): | 29.6 |
| double bond content (mmol/kg): | 8 |
| viscosity at 25° C. (mPa · s): | 931 |

Metal content in the prepared polyol without removal of the catalyst: Zn=5 ppm, Co=2 ppm.

Example 3
Preparation of a Polyether Polyol Using Catalyst C (25 ppm)

| | |
|---|---|
| Induction time: | 185 min |
| Propoxylation time: | 381 min |
| Total reaction time: | 566 min |
| Polyether polyol: | |
| OH number (mg KOH/g): | 31.2 |
| double bond content (mmol/kg): | 10 |
| viscosity at 25° C. (mPa · s): | 874 |

Example 4
Preparation of a Polyether Polyol Using Catalyst D (25 ppm)

| | |
|---|---|
| Induction time: | 188 min |
| Propoxylation time: | 168 min |
| Total reaction time: | 356 min |
| Polyether polyol: | |
| OH number (mg KOH/g): | 30.3 |
| double bond content (mmol/kg): | 9 |
| viscosity at 25° C. (mPa · s): | 850 |

Example 5
Production of a Polyether Polyol Using Catalyst E (25 ppm)

| | |
|---|---|
| Induction time: | 397 min |
| Propoxylation time: | 123 min |
| Total reaction time: | 520 min |
| Polyether polyol: | |
| OH number (mg KOH/g): | 31.9 |
| double bond content (mmol/kg): | 7 |
| viscosity at 25° C. (mPa · s): | 848 |

Example 6 (Comparison)

Under the reaction conditions described above, Catalyst F (25 ppm) exhibited no activity, even after an induction time of 10 hours.

Examples 1–5 show that, due to their considerably increased activity, the new DMC catalysts according to the invention can be used for the preparation of polyether polyols in low enough concentrations such that the separation of the catalyst from the prepared polyol can be dispensed with.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A double-metal cyanide (DMC) catalyst comprising:
   a) from 20 to 90% by weight, based on the total weight of the DMC catalyst, of one or more DMC compounds;
   b) from 0.5 to 30% by weight, based on the total weight of the DMC catalyst, of one or more organic complexing ligands; and
   c) at least one compound selected from the group consisting of organic phosphates, organic phosphites, organic phosphonates, organic phosphonites, organic phosphinates and organic phosphinites;
   with the proviso that component b) is different from component c).
2. The DMC catalyst of claim 1, additionally comprising
   d) water, and/or
   e) a water-soluble metal salt.
3. The DMC catalyst of claim 1, wherein component a) the double metal cyanide compound comprises zinc hexacyanocobaltate(III).
4. The DMC catalyst of claim 1, wherein component b) the organic complexing ligand comprises tert.-butanol.
5. The DMC catalyst of claim 1, wherein component c) is present in an amount of from 1 to 80% by weight, based on the total weight of the DMC catalyst.
6. The DMC catalyst of claim 1, wherein component c) is selected from the group consisting of phosphoric acid tri- ethyl ester, phosphoric acid tributyl ester, phosphoric acid trioctyl ester, phosphoric acid tris(2-ethylhexyl) ester, phosphoric acid tris(2-butoxyethyl) ester, butylphosphonic acid dibutyl ester, phenylphosphonic acid dioctyl ester, phosphonoformic acid triethyl ester, phosphonoacetic acid trimethyl ester, phosphonoacetic acid triethyl ester, 2-phosphonopropionic acid trimethyl ester, 2-phosphonopropionic acid triethyl ester, 2-phosphonopropionic acid tripropyl ester, 3-phosphonopropionic acid triethyl ester, tributyl phosphite, trilauryl phosphite, tris-(3-ethyloxethanyl-3-methyl) phosphite and heptakis(dipropylene glycol) phosphite.

7. A process for the preparation of a DMC catalyst comprising from 20 to 90% by weight, based on the total weight of the DMC catalyst, of one or more DMC compounds and from 0.5 to 30% by weight, based on the total weight of the DMC catalyst, of one or more organic complexing ligands by:

(1) reacting
 α) (i) one or more metal salts with (ii) one or more metal cyanide salts In an aqueous solution to form a suspension;

(2) isolating the catalyst from the suspension; and (3) drying the catalyst;
 wherein
 β) one or more organic complexing ligands are added as part of the aqueous solution during (1) said reaction, and/or to the suspension formed by (1) said reaction, and, optionally, after (2) said isolation and the suspension formed by (1) said reaction is treated with γ) one or more compounds selected from the group consisting of organic phosphates, organic phosphites, organic phosphonates, organic phosphonites, organic phosphinates and organic phosphinites, which are optionally present as a mixture with water and/or β) one or more organic complexing ligands;

with the proviso that β) the organic complexing ligands exclude organic phosphates, organic phosphites, organic phosphonates, organic phosphonites, organic phosphinates and organic phosphinites.

8. The process of claim 7, wherein the isolated catalyst is washed with a mixture comprising at least two compounds selected from the group consisting of water, β) one or more organic complexing ligands, and γ) one or more compounds selected from the group consisting of organic phosphates, organic phosphites, organic phosphonates, organic phosphonites, organic phosphinates and organic phosphinites, to form a suspension; followed by isolating the catalyst from the suspension and drying the catalyst.

9. The process of claim 7, wherein β) one or more organic complexing ligands are added after (1) said reaction as part of an aqueous solution; and the suspension formed is treated with γ) one or more compounds selected from the group consisting of organic phosphates, organic phosphites, organic phosphonates, organic phosphonites, organic phosphinates and organic phosphinites, which are present as a mixture with water and/or β) one or more organic complexing ligands.

10. The process of claim 7, wherein β) the organic complexing ligand comprises tert-butanol.

* * * * *